US009207124B2

(12) United States Patent
Funamoto

(10) Patent No.: US 9,207,124 B2
(45) Date of Patent: Dec. 8, 2015

(54) COLORIMETRY APPARATUS

(71) Applicant: Seiko Epson Corporation, Tokyo (JP)

(72) Inventor: Tatsuaki Funamoto, Shiojiri (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 14/451,729

(22) Filed: Aug. 5, 2014

(65) Prior Publication Data

US 2015/0042996 A1 Feb. 12, 2015

(30) Foreign Application Priority Data

Aug. 6, 2013 (JP) ................. 2013-163040

(51) Int. Cl.
  *G01J 3/46* (2006.01)
  *G01J 3/50* (2006.01)
  *G01J 3/02* (2006.01)
  *G01J 3/26* (2006.01)
  *G01J 3/51* (2006.01)

(52) U.S. Cl.
  CPC .............. *G01J 3/50* (2013.01); *G01J 3/0205* (2013.01); *G01J 3/0208* (2013.01); *G01J 3/0264* (2013.01); *G01J 3/26* (2013.01); *G01J 3/51* (2013.01)

(58) Field of Classification Search
  CPC .............. G01J 3/02; G01J 3/46; G01J 3/50; G01J 3/51; G01J 3/524
  USPC .................................. 356/300–445
  See application file for complete search history.

(56) References Cited

U.S. PATENT DOCUMENTS

| | | | |
|---|---|---|---|
| 4,095,875 A * | 6/1978 | Lee et al. .................. 359/515 |
| 2006/0158657 A1 | 7/2006 | De Lega et al. |
| 2007/0076214 A1 * | 4/2007 | Rothberg .................. 356/491 |
| 2007/0268575 A1 | 11/2007 | Yamazaki |
| 2009/0021739 A1 | 1/2009 | Tsujita et al. |
| 2010/0245552 A1 | 9/2010 | Higuchi |
| 2011/0164249 A1 | 7/2011 | Innami et al. |
| 2012/0120403 A1 | 5/2012 | Funamoto |

FOREIGN PATENT DOCUMENTS

| | | | |
|---|---|---|---|
| JP | 05-142074 A | 6/1993 |
| JP | 08-029258 A | 2/1996 |
| JP | 08-254659 A | 10/1996 |
| JP | 10-213480 A | 8/1998 |
| JP | 2003-028718 A | 1/2003 |
| JP | 2005-181614 A | 7/2005 |
| JP | 2005-300197 A | 10/2005 |
| JP | 2006-208102 A | 8/2006 |
| JP | 2007-311114 A | 11/2007 |

(Continued)

*Primary Examiner* — Abdullahi Nur

(74) *Attorney, Agent, or Firm* — Harness, Dickey & Pierce, P.L.C.

(57) ABSTRACT

A colorimetry apparatus includes a light projection unit that irradiates a surface under measurement with light and an imaging unit that captures an image of the surface under measurement. The light projection unit includes a light source, a collimator lens that converts light emitted from the light source into parallelized light, and a traveling direction changer that changes the traveling direction of the parallelized light while maintaining parallelism of the parallelized light. The traveling direction changer is disposed in parallel to the surface under measurement, and the direction of the optical axis of the collimator lens coincides with the direction of a normal to the surface under measurement.

8 Claims, 7 Drawing Sheets

(56) References Cited

FOREIGN PATENT DOCUMENTS

| | | |
|---|---|---|
| JP | 2008-528972 A | 7/2008 |
| JP | 2008-216479 A | 9/2008 |
| JP | 2009-039510 A | 2/2009 |
| JP | 2010-227255 A | 10/2010 |
| JP | 2011-082886 A | 4/2011 |
| JP | 2011-089961 A | 5/2011 |
| JP | 2011-097986 A | 5/2011 |
| JP | 2012-018118 A | 1/2012 |
| JP | 2012-068031 A | 4/2012 |
| JP | 2012-103208 A | 5/2012 |
| WO | WO-2006-078718 A1 | 7/2006 |

* cited by examiner

COLORIMETRY APPARATUS

BACKGROUND

1. Technical Field

The present invention relates to a colorimetry apparatus.

2. Related Art

A colorimetry apparatus that measures and evaluates the color of an object in an objective, precise manner is widely used. A light irradiation method used in the color measurement is defined in JIS Z8722. In one of the light irradiation methods defined in JIS Z8722, a specimen is irradiated with light ray fluxes inclined to a normal to the surface of the specimen by 45±2°, and light ray fluxes reflected at angles smaller than or equal to 10° with respect to the normal to the surface of the specimen are received and measured. Irradiation light ray fluxes and reception light ray fluxes are limited to those inclined to the central line by 8° or smaller. The measurement method described above complies with the method for measuring the color of an object defined in Publication CIE NO. 15: 2004 COLORIMETRY, THIRD EDITION.

JP-A-8-29258 discloses a colorimetry apparatus using the light irradiation method described above. In the colorimetry apparatus disclosed in JP-A-8-29258, light emitted from a light source is collected by a collector lens and the collected light is allowed to pass through a diaphragm. The configuration allows a virtual image of the light source to be nearly a point light source. The light having passed through the diaphragm is then parallelized by a collimator lens. A surface under measurement is irradiated with the parallelized light in an oblique direction inclined to a surface under measurement by 45°. Divergent light reflected off the surface under measurement is collected by using a collector lens and an integrating sphere, and a spectrometer is irradiated with the collected light. An optical sensor is irradiated with the light having passed through the spectrometer. The optical sensor converts the intensity of the light into an electric signal and outputs the electric signal.

In the colorimetry apparatus disclosed in JP-A-8-29258, the optical axis of the collimator lens intersects a normal to the surface under measurement at an angle of 45°. As a result, the optical path length from the collimator lens to the surface under measurement varies depending on location in the parallelized light. The parallelized light having exited out of the collimator lens is not exactly parallelized but contains divergent light. The surface under measurement is therefore so illuminated that the illuminance varies from location to location on the surface under measurement. That is, the illuminance at a location where the optical path length from the collimator lens to the surface under measurement is longer is lower than the illuminance at a location where the optical path length is shorter. When the colorimetry apparatus performs colorimetry at a plurality of locations on the surface under measurement instead of a single location thereon, the non-uniform illuminance over the surface under measurement causes a decrease in measurement precision. In view of the fact described above, it has been desired to provide a colorimetry apparatus that irradiates a surface under measurement with light that provides a uniform illuminance distribution for colorimetry.

SUMMARY

An advantage of some aspects of the invention is to solve at least a part of the problems described above, and the invention can be implemented as the following forms or application examples:

APPLICATION EXAMPLE 1

This application example is directed to a colorimetry apparatus including a light projection unit that irradiates a surface under measurement with light and an imaging unit that captures an image of the surface under measurement. The light projection unit includes a light source, a collimator lens that converts light emitted from the light source into parallelized light, and a traveling direction changer that changes the traveling direction of the parallelized light while maintaining parallelism of the parallelized light, and a light exiting surface of the traveling direction changer through which the parallelized light exits is disposed in parallel to the surface under measurement, and the optical axis of the collimator lens is parallel to a normal to the surface under measurement.

According to this application example, the colorimetry apparatus includes a light projection unit and an imaging unit. The light projection unit irradiates a surface under measurement with light, and the imaging unit captures an image of the surface under measurement. The colorimetry apparatus uses the image captured by the imaging unit to measure the color of the surface under measurement. Light emitted from a light source passes through a collimator lens, which converts the light into parallelized light. The parallelized light passes through a traveling direction changer, which redirects the parallelized light with the parallelism thereof maintained, and the surface under measurement is then irradiated with the parallelized light.

The optical axis of the collimator lens is parallel to a normal to the surface under measurement. The distance between the collimator lens and the surface under measurement is therefore substantially fixed. The traveling direction changer is disposed in a position between the collimator lens and the surface under measurement. A light exiting surface of the traveling direction changer is disposed in parallel to the surface under measurement. As a result, light rays that form the light having passed through the collimator lens travel in parallel to each other, and hence the optical path length between the collimator lens and the surface under measurement is substantially fixed.

The parallelized light having passed through the collimator lens is not exactly parallelized but contains divergent light. When the parallelized light is a set of a plurality of light rays, the degrees of divergence of the light rays are substantially the same because the optical path lengths of the light rays are substantially the same. As a result, the light with which the surface under measurement is irradiated can be uniformly distributed.

APPLICATION EXAMPLE 2

This application example is directed to the colorimetry apparatus according to the application example described above, wherein the optical path length of the parallelized light from the traveling direction changer to the surface under measurement is fixed within an area where the parallelized light travels.

According to this application example, the optical path length between the traveling direction changer and the surface under measurement is fixed within an area where the parallelized light travels. The degree of divergence of the light can be substantially fixed between the collimator lens and the surface under measurement. As a result, the light with which the surface under measurement is irradiated can be uniformly distributed.

APPLICATION EXAMPLE 3

This application example is directed to the colorimetry apparatus according to the application example described above, which further includes a filter provided in a position between the traveling direction changer and the surface under measurement, the filter preventing light other than the parallelized light from passing therethrough.

According to this application example, a filter is disposed in a position between the traveling direction changer and the surface under measurement. The filter removes a divergent portion of the parallelized light. The filter therefore substantially prevents the parallelized light having passed therethrough from diverging, whereby variation in the optical intensity distribution due to divergence of the light can be suppressed. As a result, the light with which the surface under measurement is irradiated can be more uniformly distributed.

APPLICATION EXAMPLE 4

This application example is directed to the colorimetry apparatus according to the application example described above, wherein the optical path length of the parallelized light from the filter to the surface under measurement is fixed within an area where the parallelized light travels.

According to this application example, the optical path length between the filter and the surface under measurement is fixed within an area where the parallelized light travels. The degree of divergence of the light can be substantially fixed between the filter and the surface under measurement. As a result, the light with which the surface under measurement is irradiated can be uniformly distributed.

APPLICATION EXAMPLE 5

This application example is directed to the colorimetry apparatus according to the application example described above, wherein the collimator lens is a Fresnel lens.

According to this application example, the collimator lens is a Fresnel lens. The collimator lens is therefore a thin lens. As a result, the length of the colorimetry apparatus in the axial direction of the collimator lens can be shortened.

APPLICATION EXAMPLE 6

This application example is directed to the colorimetry apparatus according to the application example described above, wherein the traveling direction changer is a prism array having rod-shaped prisms arranged therein.

According to this application example, the traveling direction changer is a prism array. The traveling direction changer is therefore a thin portion. As a result, the length of the colorimetry apparatus in the thickness direction of the traveling direction changer can be shortened.

APPLICATION EXAMPLE 7

This application example is directed to the colorimetry apparatus according to the application example described above, wherein the traveling direction changer is formed of a plurality of the prism array layered over one another.

According to this application example, the traveling direction changer is formed of a plurality of the prism array layered over one another. Therefore, even when the prism array at each stage deflects the parallelized light by only a small angle, the traveling direction changer can cause the parallelized light to travel in a desired direction.

APPLICATION EXAMPLE 8

This application example is directed to the colorimetry apparatus according to the application example described above, wherein the light projection unit is provided in a plurality of positions, and the plurality of light projection units irradiates the surface under measurement.

According to this application example, a plurality of light projection units irradiate the surface under measurement. As a result, the intensity of the parallelized light with which the surface under measurement is irradiated can be increased.

BRIEF DESCRIPTION OF THE DRAWINGS

The invention will be described with reference to the accompanying drawings, wherein like numbers reference like elements.

FIG. 6A is a schematic perspective view showing the structure of a filter. FIG. 6B is a schematic perspective view showing the structure of an upper filter. FIG. 6C is a schematic perspective view showing the structure of a lower filter.

FIG. 7A is a diagrammatic plan view showing the structure of a colorimetry apparatus. FIG. 7B is a diagrammatic side view showing the structure of the colorimetry apparatus.

DESCRIPTION OF EXEMPLARY EMBODIMENTS

Figure 1:
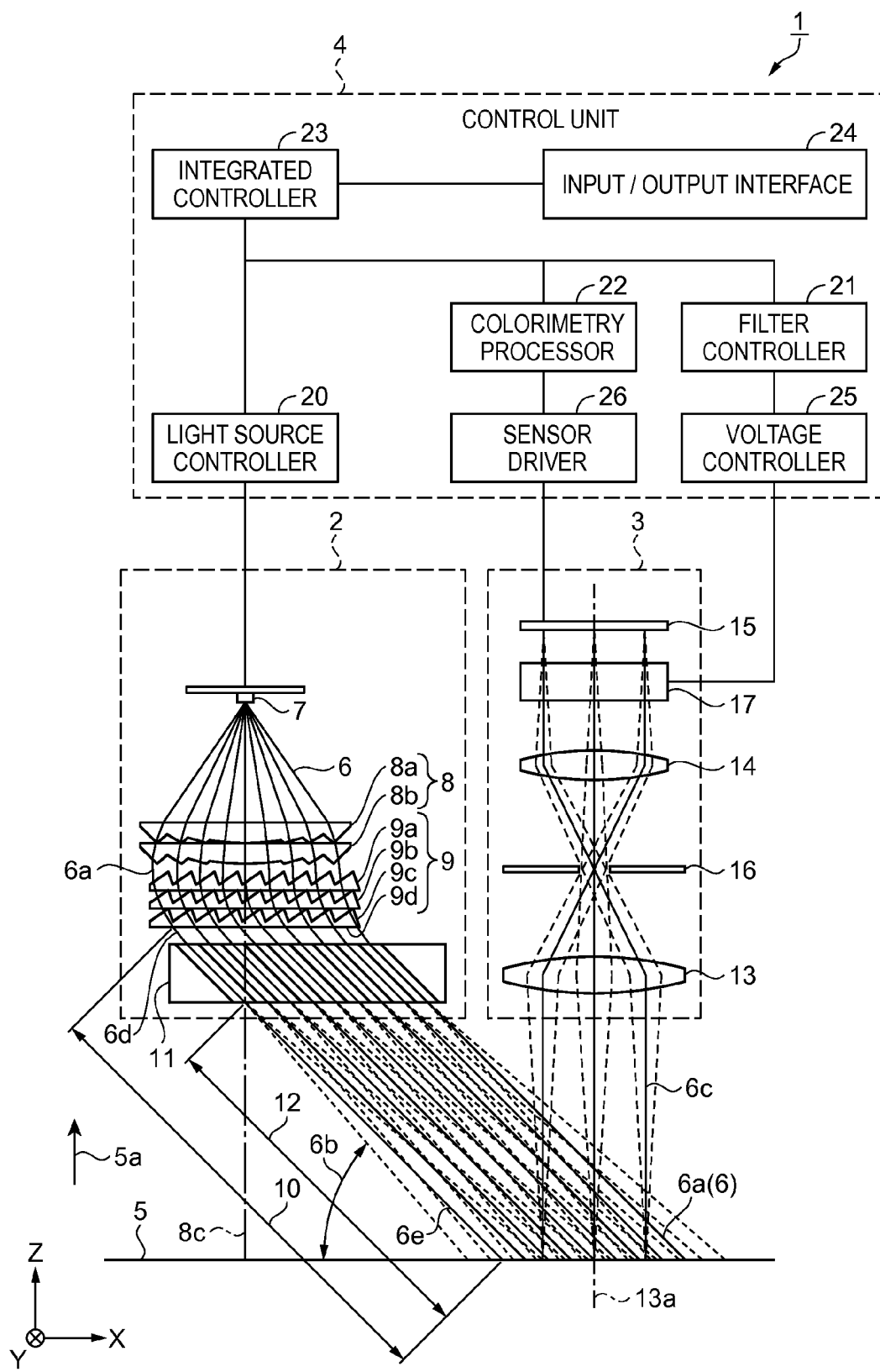
FIG. 1 is a diagrammatic configuration diagram showing the configuration of a colorimetry apparatus according to a first embodiment.

In each embodiment of the invention, a description will be made of a characteristic example of a colorimetry apparatus with reference to FIGS. 1 to 7A and 7B. In the following sections, embodiments will be described with reference to the drawings. Members in the drawings are drawn in respective scales different from each other in order to be large enough to be recognized in the drawings. A light ray is drawn in the form of a line in the drawings for ease of illustration, but a light ray is actually a set of a plurality of light rays.

First Embodiment

A colorimetry apparatus according to a first embodiment will be described with reference to FIGS. 1 to 5A and 5B. FIG. 1 is a diagrammatic configuration diagram showing the configuration of the colorimetry apparatus. A colorimetry apparatus 1 includes a light projection unit 2, an imaging unit 3, and a control unit 4, as shown in FIG. 1. The light projection unit 2 is a portion that irradiates a surface under measurement 5 with light 6. The imaging unit 3 is a portion that receives light 6c reflected off the surface under measurement 5. The control unit 4 is a portion that controls the light projection unit 2 and the imaging unit 3. The imaging unit 3 is disposed in a position that faces a portion irradiated with the light 6 by the light projection unit 2. The direction from the light projection unit 2 toward the imaging unit 3 is called an X direction. The surface under measurement 5 is so disposed that the light projection unit 2 and the imaging unit 3 face the surface under measurement 5. The direction of a normal to the surface under measurement is called a Z direction. The direction perpendicular to the X and Z directions is called a Y direction. The surface under measurement 5 extends in the X and Y directions. The surface under measurement 5 is not limited to a specific surface and is, for example, a surface of a sheet of paper or a surface of an object. The colorimetry apparatus 1 measures the color of the surface under measurement 5.

The light projection unit 2 includes a light source 7, which emits the light 6. The light source 7 is not limited to a light source of a specific type but is preferably a light source that provides a uniform optical intensity distribution irrespective of the frequency. The light source 7 further preferably has a point-like light emitting portion. In the present embodiment, the light source 7 is, for example, a white LED (light emitting diode). The light 6 emitted from the light source 7 spreads in a conical form. The intensity distribution of the light 6 shows that the intensity is maximized at the center of the conical shape and the intensity decreases with distance from the center toward the periphery. When the optical intensity distribution of the light 6 emitted from the light source 7 is not flat, a diaphragm may be disposed to extract only a central portion of the distribution of the light 6.

A collimator lens 8 is disposed on the –Z-direction side of the light source 7. The collimator lens 8 is formed of a first lens 8a and a second lens 8b layered on each other. Each of the first lens 8a and the second lens 8b is a Fresnel lens, which is a lens that is thin in the Z direction. The light projection unit 2 is therefore a portion having a short length in the Z direction. The collimator lens 8 is irradiated with the light 6 emitted from the light source 7. The light 6 then passes through the collimator lens 8, which converts the light 6 into parallelized light 6a. The collimator lens 8, which is formed of two lenses, the first lens 8a and the second lens 8b, may instead be formed of one lens or three or more lenses.

The direction of an optical axis 8c of the collimator lens 8 coincides with the direction of a normal 5a to the surface under measurement 5. Accordingly, the traveling direction of the parallelized light 6a is in parallel to the direction of the normal 5a. The distance between the collimator lens 8 and the surface under measurement 5 is therefore fixed over the collimator lens 8, that is, the distance on the X-direction side of the collimator lens 8 is equal to the distance on the –X-direction side thereof.

A traveling direction changer 9 is disposed on the –Z-direction side of the collimator lens 8 in a position facing the collimator lens 8. The traveling direction changer 9 has a function of deflecting the traveling direction of the parallelized light 6a toward the X-direction side by 45°. The traveling direction changer 9 includes a first prism array 9a, a second prism array 9b, and a third prism array 9c layered on each other. Each of the first prism array 9a, the second prism array 9b, and the third prism array 9c can deflect the traveling direction of the parallelized light 6a. In detail, the first prism array 9a deflects the parallelized light 6a by 13.9° with respect to the direction of the normal 5a. The second prism array 9b deflects the parallelized light 6a by 28.4° with respect to the direction of the normal 5a. The third prism array 9c deflects the parallelized light 6a by 45° with respect to the direction of the normal 5a. The traveling direction changer 9, which is formed of the first prism array 9a, the second prism array 9b, and the third prism array 9c layered on each other, can therefore deflect the parallelized light 6a by 45° and cause the deflected light to travel. The parallelized light 6a is thus converted into parallelized light 6d inclined to the direction of the normal 5a by 45°, and the parallelized light 6d travels toward the surface under measurement 5. Each of the first prism array 9a, the second prism array 9b, and the third prism array 9c is thinner than a discrete triangle-pole-shaped prism, which is not a prism array. As a result, the length of the colorimetry apparatus in the thickness of the traveling direction changer can be shortened.

A surface of the traveling direction changer 9, specifically, the surface thereof facing the surface under measurement 5 is called a light exiting surface 9d. The traveling direction changer 9 is so disposed that the light exiting surface 9d of the traveling direction changer 9 is parallel to the surface under measurement 5. Light rays that form the parallelized light 6a having passed through the collimator lens 8 are redirected at a position set apart from the surface under measurement 5 by a fixed distance. The light rays that form the parallelized light 6a then travel in parallel to one another. The optical path length between the traveling direction changer 9 and the surface under measurement 5 is called a first optical path length 10. The first optical path length 10 is substantially fixed over the traveling direction changer 9, that is, the length 10 on the –X-direction side of the traveling direction changer 9 is equal to the length 10 on the X-direction side thereof. The parallelized light 6a having passed through the collimator lens 8 is not exactly parallelized but contains the divergent light 6. The degree of divergence of the light 6 is, however, also substantially fixed irrespective of the location on the surface under measurement 5 irradiated with the light 6 because the first optical path length 10 is substantially fixed. As a result, the light 6 with which the surface under measurement 5 is irradiated can be uniformly distributed.

A filter 11 is disposed on the –Z-direction side of the traveling direction changer 9 in a position facing the traveling direction changer 9. The filter 11 absorbs and hence removes the divergent light 6 contained in the parallelized light 6a. The filter 11 therefore prevents the parallelized light 6a passing therethrough from diverging, whereby the light with which the surface under measurement is irradiated can be more uniformly distributed. The filter 11 limits the light rays that form the light 6 to those inclined to the central line by 8° or smaller.

The optical path length between the filter 11 and the surface under measurement 5 is called a second optical path length 12. The filter 11 is disposed in parallel to the surface under measurement 5. The second optical path length 12 is therefore substantially fixed over the filter 11, that is, the length 12 on the –X-direction side of the filter 11 is equal to the length 12 on the X-direction side thereof. Parallelized light 6e having passed through the filter 11 is not exactly parallelized but contains the divergent light 6. The degree of divergence of the light 6 is, however, substantially fixed irrespective of the location on the surface under measurement 5 irradiated with the light 6 because the second optical path length 12 is substantially fixed. As a result, the light 6 with which the surface under measurement 5 is irradiated can be uniformly distributed.

In the light projection unit 2, the light 6 passes through the collimator lens 8, the traveling direction changer 9, and the filter 11. As a result, the light 6 radiated from the light projection unit 2 forms the parallelized light 6e, with which the surface under measurement 5 is obliquely irradiated at uniform optical intensity. The surface under measurement 5 is therefore irradiated with the parallelized light 6e, which provides uniform optical intensity, at an irradiation angle 6b. The irradiation condition described above complies with the irradiation condition defined in JIS Z8722.

The parallelized light 6e with which the surface under measurement 5 is irradiated is reflected off the surface under measurement 5. The imaging unit 3 is disposed in a position facing the portion irradiated with the parallelized light 6e. The imaging unit 3 receives part of the light 6c reflected off the surface under measurement 5 in a diffuse reflection process. The imaging unit 3 includes an object-side telecentric lens 13, an image-side telecentric lens 14, and an imaging device 15 disposed along an optical axis 13a. Each of the object-side telecentric lens 13 and the image-side telecentric lens 14 is drawn in a simplified manner in the form of a single lens in FIG. 1 but actually formed of a plurality of lens groups, and the telecentric lenses form a telecentric system. The telecentric system is so disposed that an image of the surface under measurement 5 is formed on the imaging device 15.

Part of the light 6c reflected off the surface under measurement 5 passes through the object-side telecentric lens 13. A diaphragm 16 is disposed in a position between the object-side telecentric lens 13 and the image-side telecentric lens 14. The light 6c having passed through the object-side telecentric lens 13 passes through the diaphragm 16 and then travels toward the image-side telecentric lens 14. Light 6c that travels in a direction inclined to the optical axis 13a by at least 8° is blocked by the diaphragm 16. Observable light 6c is therefore limited to light 6c indicated by the broken lines in FIG. 1.

The light 6c having passed through the diaphragm 16 is incident on the image-side telecentric lens 14. A wavelength tunable interference filter 17 is disposed in a position between the image-side telecentric lens 14 and the imaging device 15. The light 6c having passed through the image-side telecentric lens 14 is incident on the wavelength tunable interference filter 17. The wavelength tunable interference filter 17 is capable of changing the wavelength of the light 6c that is allowed to pass therethrough with the aid of an electric signal. The thus disposed wavelength tunable interference filter 17 allows only light 6c of a specified wavelength to travel.

The light 6c having passed through the wavelength tunable interference filter 17 is incident on the imaging device 15, and an image of the surface under measurement 5 is formed on the imaging device 15. The imaging device 15 only needs to be capable of converting an optical image into an electric signal and is not limited to a specific device. The imaging device 15 can, for example, be a CCD (charge coupled device) imaging device or a solid-state imaging device using a CMOS (complementary metal oxide semiconductor) technology.

The control unit 4 controls the overall action of the colorimetry apparatus 1. The control unit 4 can, for example, be a general-purpose personal computer, a personal digital assistant, or a computer dedicated for colorimetry. The control unit 4 includes a light source controller 20, a filter controller 21, a colorimetry processor 22, an integrated controller 23, and an input/output interface 24. The integrated controller 23 is connected to the input/output interface 24 and receives an instruction signal from an external apparatus (not shown), an instruction signal from an operator, and other inputs via the input/output interface 24. The integrated controller 23 is further connected to the light source controller 20, the filter controller 21, and the colorimetry processor 22. The integrated controller 23 outputs instruction signals to the light source controller 20, the filter controller 21, and the colorimetry processor 22 to control them.

The light source controller 20 is connected to the light source 7. The light source controller 20 outputs a predetermined voltage to the light source 7 based, for example, on an input set by the operator to cause the light source 7 to emit light 6 of predetermined luminance. The filter controller 21 is connected to the wavelength tunable interference filter 17 via a voltage controller 25. The integrated controller 23 sets the wavelength of light to be received by the imaging device 15 based, for example, on an input set by the operator and outputs a control signal to the filter controller 21 to cause the wavelength tunable interference filter 17 to transmit the light 6c of the set wavelength. The filter controller 21 receives the control signal and causes the voltage controller 25 to output a voltage corresponding to the control signal to the wavelength tunable interference filter 17. The wavelength tunable interference filter 17 then transmits the light 6c of the set wavelength toward the imaging device 15.

The imaging device 15 is connected to the colorimetry processor 22 via a sensor driver 26. The sensor driver 26 supplies the imaging device 15 with electric power and receives an output from the imaging device 15. The sensor driver 26 converts an electric signal corresponding to the image projected on the imaging device 15 into a digital signal and outputs the digital signal to the colorimetry processor 22. The colorimetry processor 22 calculates the chromaticity of the light reflected off the surface under measurement 5 and outputs the chromaticity to the integrated controller 23. The integrated controller 23 successively changes the wavelength of the light 6c that the wavelength tunable interference filter 17 allows to pass therethrough and receives data on images projected on the imaging device 15. The integrated controller 23 thus obtains image information on a wavelength basis and outputs the image information to an external apparatus via the input/output interface 24. The integrated controller 23 may combine image data corresponding to a plurality of wavelengths with one another and output the combined image to the external apparatus via the input/output interface 24.

Figure 2A:
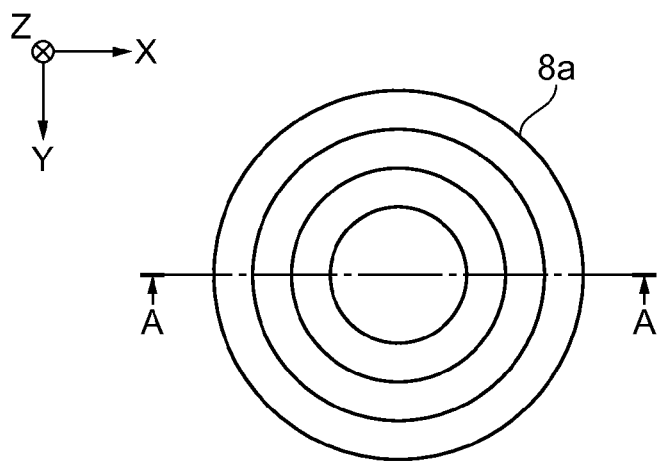
FIG. 2A is a diagrammatic plan view showing a first lens.
Figure 2B:
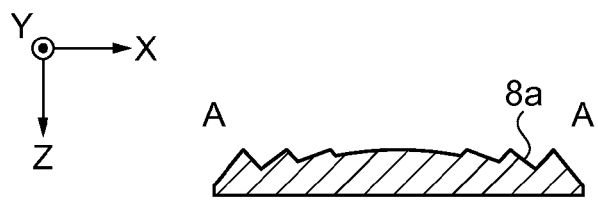
FIG. 2B is a diagrammatic cross-sectional side view showing the first lens.

FIG. 2A is a diagrammatic plan view showing the first lens. FIG. 2B is a diagrammatic cross-sectional side view showing the first lens. FIG. 2B is a cross-sectional view taken along the line A-A in FIG. 2A. The first lens 8a is a convex Fresnel lens having protrusions and recesses formed thereon in a concentric pattern, as shown in FIGS. 2A and 2B. The first lens 8a is therefore a lens that is thin in the Z direction along the optical axis. The second lens 8b is a convex Fresnel lens as in the case of the first lens 8a. The second lens 8b is therefore also a lens that is thin in the Z direction along the optical axis.

Figure 2C:
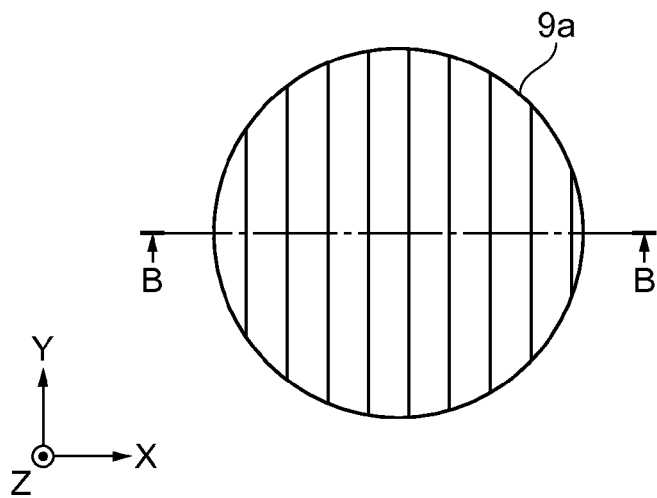
FIG. 2C is a diagrammatic plan view showing a first prism array.
Figure 2D:
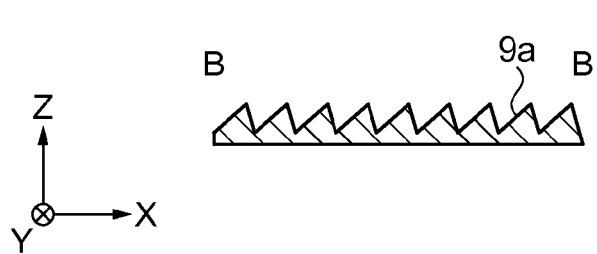
FIG. 2D is a diagrammatic cross-sectional side view showing the first prism array.

FIG. 2C is a diagrammatic plan view showing the first prism array. FIG. 2D is a diagrammatic cross-sectional side view showing the first prism array. FIG. 2D is a cross-sectional view taken along the line B-B in FIG. 2C. The first prism array 9a has triangular prisms arranged therein in parallel to each other, as shown in FIGS. 2C and 2D. The first prism array 9a is therefore a prism that is thin in the Z direction. Each of the second prism array 9b and the third prism array 9c has triangular prisms arranged therein in parallel to each other, as in the case of the first prism array 9a. Each of the second prism array 9b and the third prism array 9c is therefore also a prism that is thin in the Z direction.

Figure 3A:
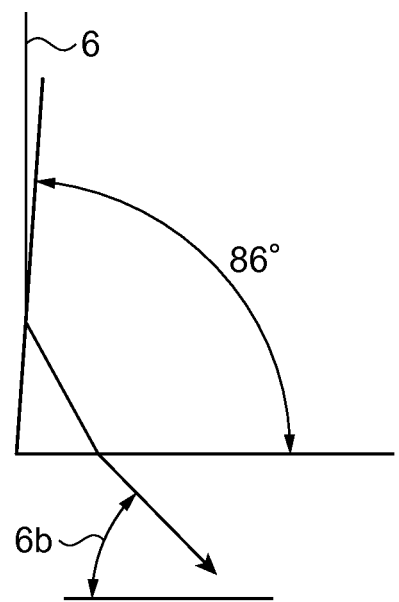
FIGS. 3A and 3B are diagrammatic views for each describing the configuration of a prism.
Figure 3B:
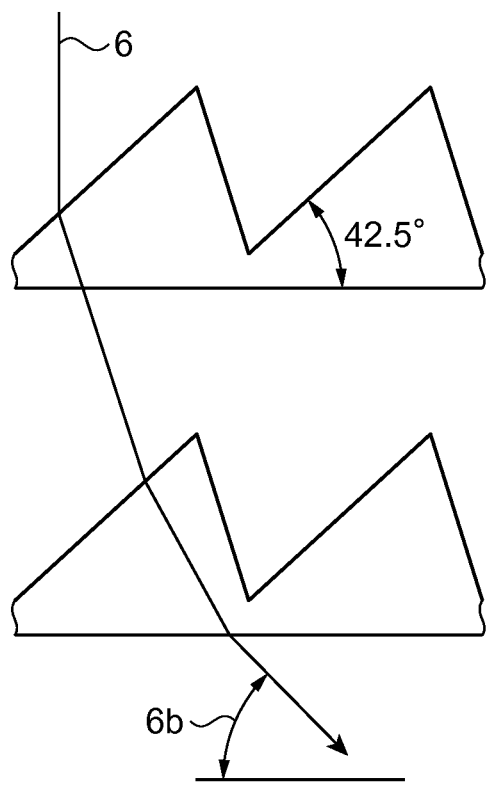

FIGS. 3A and 3B are diagrammatic views for each describing the configuration of a prism. FIG. 3A shows a state in which a single prism is used to change the traveling direction of the light 6 by 45°. FIG. 3B shows a state in which two prisms are used to change the traveling direction of the light 6 by 45°. To cause the light 6 to travel at the irradiation angle 6b, the traveling direction of the light 6 needs to be deflected by 45°, as shown in FIG. 3A. It is assumed that the prism is made, for example, of an acrylic resin having a refractive index of 1.49. In this case, when a single prism is used, the angle of the prism needs to be set at 86°. Even when a signal prism is used and the prism is instead made, for example, of a glass material having a refractive index of 1.6, the angle of the prism needs to be set at 69.9°. A prism array formed of either of the prisms described above therefore has an acute angle on the side facing the light source 7 and the gap between adjacent prisms is narrow, and the prism array is hence difficult to manufacture.

When two prism arrays layered on each other are used, each of the prism arrays deflects the light 6 by an angle of 21.8°, as shown in FIG. 3B. In this case, the angle of each prism is set at 42.5°. The angle of the prism array on the side facing the light source 7 is therefore close to 90° and the gap between adjacent prisms is wide, and the prism array is hence readily manufactured. Further, when three prism arrays layered on each other are used, each of the prism arrays deflects the light 6 by an angle of 13.9°. Each of the prism arrays can therefore be more readily manufactured.

Figure 4A:
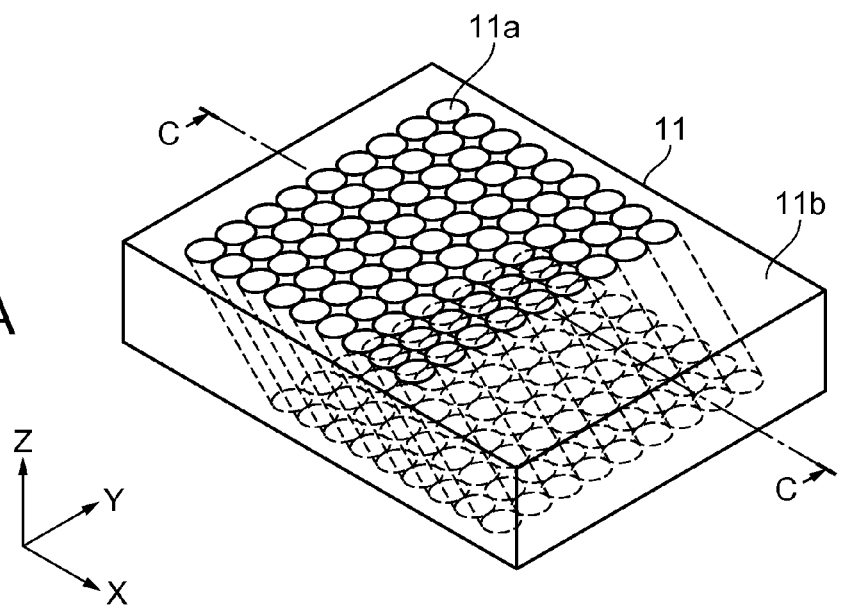
FIG. 4A is a schematic perspective view showing the structure of a filter.
Figure 4B:
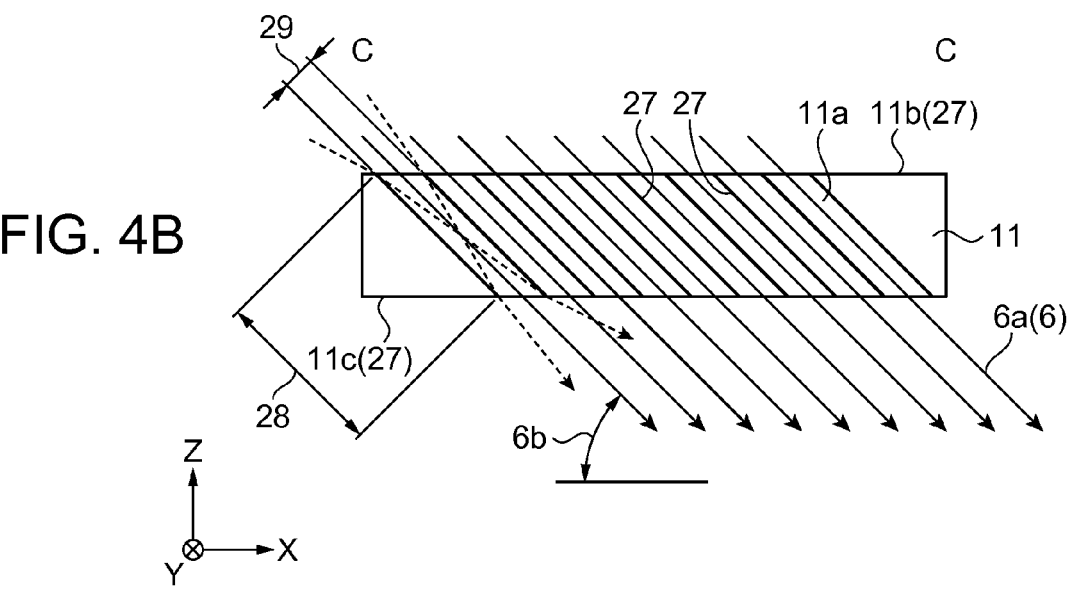
FIG. 4B is a diagrammatic cross-sectional side view showing the structure of the filter.

FIG. 4A is a schematic perspective view showing the structure of the filter. FIG. 4B is a diagrammatic cross-sectional side view showing the structure of the filter. FIG. 4B is a cross-sectional view taken along the line C-C in FIG. 4A with no hatching drawn for ease of illustration. The filter 11 has a plate-like shape having rectangular flat surfaces and has cylindrical light guide portions 11a arranged therein, as shown in FIGS. 4A and 4B. In the present embodiment, the light guide portions 11a are arranged in a grid pattern formed of 9 rows by 9 columns, but the number of rows and columns is not limited to specific values and may be set in accordance with ease of manufacture and required optical characteristics.

The surface of the filter 11 on the Z-direction side is called an upper surface 11b, and the surface of the filter 11 on the −Z-direction side is called a lower surface 11c. The light guide portions 11a are disposed throughout the portion between the upper surface 11b and the lower surface 11c. The direction in which the light guide portions 11a extend is inclined to the X and Z directions and perpendicular to the Y direction. The direction in which the light guide portions 11a extend coincides with the direction in which the light 6 traveling at the irradiation angle 6b travels after undergoing refraction processes. The upper surface 11b and the lower surface 11c are parallel to each other. The light 6 incident on the light guide portions 11a at the irradiation angle 6b passes through the light guide portions 11a and then exits out thereof at the irradiation angle 6b.

A light absorbing film 27, which absorbs the light 6, is disposed on the upper surface 11b and the lower surface 11c in portions other than the light guide portions 11a. The light absorbing film 27 may, for example, be a film having carbon granules arranged therein. The light absorbing film 27 is further disposed on the side surface of each of the light guide portions 11a. The light 6 incident on the light absorbing film 27 is absorbed by the light absorbing film 27 and hence does not pass through the filter 11.

The traveling direction of the parallelized light 6a having passed through the filter 11 varies, and the variation is set by a light guide portion length 28, which represents the length of the light guide portions 11a, and a light guide portion diameter 29, which represents the diameter of the light guide portions 11a. The longer the light guide portion length 28, the smaller the variation, and the smaller the light guide portion diameter 29, the smaller the variation. Adjusting the light guide portion length 28 and the light guide portion diameter 29 therefore allows the degree of variation in the traveling direction of the parallelized light 6a having passed through the filter 11 to be set. In the present embodiment, light rays that form the parallelized light 6a are limited to those inclined to the central line by 8° or smaller.

Figure 5A:
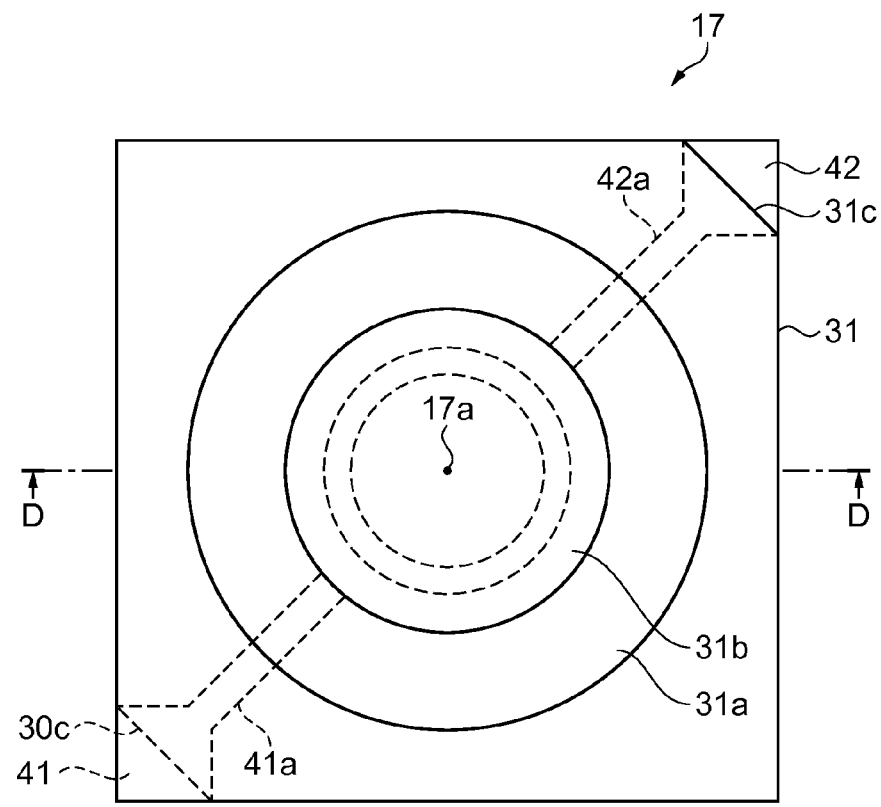
FIG. 5A is a diagrammatic plan view showing the configuration of a wavelength tunable interference filter.
Figure 5B:
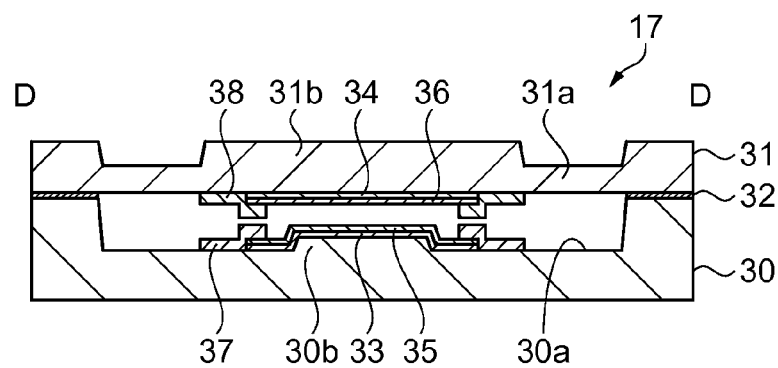
FIG. 5B is a diagrammatic cross-sectional side view showing the configuration of the wavelength tunable interference filter.

FIG. 5A is a diagrammatic plan view showing the configuration of the wavelength tunable interference filter. FIG. 5B is a diagrammatic cross-sectional side view showing the configuration of the wavelength tunable interference filter. FIG. 5B is a cross-sectional view taken along the line D-D in FIG. 5A. The wavelength tunable interference filter 17 is a filter called a Fabry-Perot etalon. The wavelength tunable interference filter 17 includes a fixed substrate 30 and a movable substrate 31. Each of the fixed substrates 30 and the movable substrate 31 is made, for example, of silica glass, soda glass, crystalline glass, lead glass, potassium glass, borosilicate glass, no-alkali glass, or any of a variety of other glass materials, quartz, or silicon. The fixed substrates 30 and the movable substrate 31 are bonded to and integrated with each other via a bonding film 32, which is formed, for example, of a plasma polymerization film primarily made, for example, of siloxane.

The fixed substrate 30 has a recess 30a, which is formed, for example, in an etching process, and a protrusion 30b, on which a first reflection film 33 is disposed. A cutout 30c is provided at part of an outer circumferential edge of the fixed substrate 30, specifically, a lower left portion in FIG. 5A, and the cutout 30c exposes an electrode pad 41 on the movable substrate 31 to the front side of the wavelength tunable interference filter 17.

The recess 30a has a ring-like shape around a filter center point 17a of the fixed substrate 30 in a plan view viewed along the thickness direction of the fixed substrate 30. The protrusion 30b protrudes from a central portion of the recess 30a toward the movable substrate 31 in the plan view viewed along the thickness direction of the fixed substrate 30. The bottom surface of the recess 30a forms an electrode placement surface on which a first drive electrode 37 of an electrostatic actuator is placed. The front end surface of the thus protruding protrusion 30b forms a reflection film placement surface on which the first reflection film 33 is placed.

The movable substrate 31 has a movable portion 31b having a circular shape around the filter center point 17a in a plan view viewed along the thickness direction of the movable substrate 31. The movable substrate 31 further has a holding portion 31a, which has a ring-like shape concentric with the movable portion 31b and holds the movable portion 31b. A cutout 31c is provided at a corner of the movable substrate 31, specifically, the upper right corner in FIG. 5A, and the cutout 31c exposes an electrode pad 42 on the fixed substrate 30. The movable portion 31b is formed to be thicker than the holding portion 31a. The movable portion 31b is so formed that it has a diameter greater than the diameter of the outer circumferential edge of the reflection film placement surface of the protrusion 30b in the plan view viewed along the thickness direction of the movable substrate 31.

The first reflection film 33 is provided on the protrusion 30b of the fixed substrate 30, and a second reflection film 34 is provided on the movable portion 31b of the movable substrate 31. The first reflection film 33 and the second reflection film 34 are so disposed that they face each other via an inter-reflection-film gap. Further, a first conductive film 35, which is electrically conductive, is layered on the first reflection film 33, and a second conductive film 36, which is electrically conductive, is layered on the second reflection film 34. The first conductive film 35 and the second conductive film 36 are so formed that the first conductive film 35 and the first reflection film 33 have the same size and the second conductive film 36 and the second reflection film 34 have the same size. The wavelength tunable interference filter 17 is provided with an electrostatic actuator used to change the size of the inter-reflection-film gap. The electrostatic actuator is formed of the first drive electrode 37, which is provided on the fixed substrate 30, and a second drive electrode 38, which is provided on the movable substrate 31. The pair of drive electrodes, the first drive electrode 37 and the second drive electrode 38, face each other via an inter-electrode gap and function as the electrostatic actuator.

The first drive electrode 37 has a ring-like shape. The first drive electrode 37 does not necessarily have a specific configuration and can, for example, be an electrode having a configuration in which a ground layer is formed of a Cr film and an Au film as an electrode layer is layered on the Cr film. In this case, the Cr film has a thickness of about 10 nm, and the Au film has a thickness ranging from 100 to 200 nm. The Cr film, which is the ground layer, may be replaced with a film made, for example, of Ti, NiCr, or TiW. Further, the first drive electrode 37 may instead be formed of a transparent conductive film made, for example, of ITO (indium tin oxide).

The first drive electrode 37 is in contact with the entire outer circumferential edge of the first conductive film 35, which is formed on the first reflection film 33. The first reflection film 33 is made of Ag or an alloy primarily containing Ag and has a thickness ranging from 10 to 80 nm. Using Ag or an alloy primarily containing Ag to form the first reflection film 33 can provide excellent optical transmission and reflection characteristics. The first conductive film 35 is formed of a transparent conductive film made, for example, of an indium-based oxide, a tin-based oxide, or a zinc-based oxide. Specifically, ITO, ICO (cerium-doped indium oxide), AZO (aluminum-doped zinc oxide), SnO, or any other suitable compound is used. Further, DLC (diamond-like carbon) can also be used. The first conductive film 35 has a thickness ranging from 5 to 30 nm. The first conductive film 35 can thus be formed without compromise of the optical transmittance characteristic of the first reflection film 33. The first refection film 33, the first conductive film 35, and the first drive electrode 37 are thus electrically connected to each other for electrical conduction. The first drive electrode 37 is connected to the electrode pad 42 via a wiring line 42a.

The second drive electrode 38 has a ring-like shape as in the case of the first drive electrode 37. The second drive electrode 38 is not limited to a specific one and can, for example, be an electrode having a configuration in which a ground layer is formed of a Cr film and an Au film as an electrode layer is layered on the Cr film. The thicknesses of the Cr film and the Au film are sized in the same manner as in the first drive electrode 37.

The second drive electrode 38 is in contact with the entire outer circumferential edge of the second conductive film 36, which is formed on the second reflection film 34. The second reflection film 34 is made of Ag or an alloy primarily containing Ag and has a thickness ranging from 10 to 80 nm, as in the case of the first reflection film 33. The second conductive film 36 is formed of a transparent conductive film made, for example, of an indium-based oxide, a tin-based oxide, or a zinc-based oxide. Specifically, ITO, ICO (cerium-doped indium oxide), AZO (aluminum-doped zinc oxide), SnO, or any other suitable compound is used. Further, DLC (diamond-like carbon) can also be used. The second conductive film 36 has a thickness ranging from 5 to 30 nm. The second conductive film 36 can thus be formed without compromise of the optical transmittance characteristic of the second reflection film 34. The second refection film 34, the second conductive film 36, and the second drive electrode 38 are thus electrically connected to each other for electrical conduction. The second drive electrode 38 is connected to the electrode pad 41 via a wiring line 41a.

The voltage controller 25 is connected to the electrode pads 41 and 42. The voltage controller 25, when it receives a voltage command signal corresponding to a wavelength under measurement from the filter controller 21, applies a voltage corresponding to the wavelength under measurement to the gap between the electrode pads 41 and 42. As a result, an electrostatic attractive force based on the voltage applied to the gap between the first drive electrode 37 and the second drive electrode 38 in the wavelength tunable interference filter 17 is produced. The movable portion 31b is therefore displaced toward the fixed substrate 30, and the size of the gap between the first reflection film 33 and the second reflection film 34 changes accordingly.

The first reflection film 33 and the second reflection film 34 form a Fabry-Perot interferometer having a variable gap size. The light 6 incident through the first reflection film 33 repeatedly undergoes multiple reflection between the first reflection film 33 and the second reflection film 34. Light rays of the light 6 that are in phase with each other at the second reflection film 34 pass through the second reflection film 34 at increased transmittance. Light rays of the light 6 that are out of phase with each other at the second reflection film 34 return to the first reflection film 33. Therefore, out of the light 6 incident on the wavelength tunable interference filter 17, only light rays of the light 6 that undergo the multiple reflection between the first reflection film 33 and the second reflection film 34 and become in phase with each other pass through the wavelength tunable interference filter 17. The wavelength of the light 6 that pass through the wavelength tunable interference filter 17 can be set by the size of the gap. The wavelength tunable interference filter 17 can therefore only transmit the light 6 of a wavelength specified by the filter controller 21.

The light 6 that passes through the wavelength tunable interference filter 17 is limited to the light 6 of the specified wavelength. The light 6 having passed through the wavelength tunable interference filter 17 is incident on the imaging device 15. The imaging device 15 thus captures an image of the light 6 of the specified wavelength extracted from the light 6 reflected off the surface under measurement 5. The integrated controller 23 instructs the filter controller 21 to set a wavelength of the light that is allowed to pass through the wavelength tunable interference filter 17 and captures an image projected on the imaging device 15. The integrated controller 23 can then successively change the wavelength of the light that is allowed to pass through the wavelength tunable interference filter 17 and captures an image of the light of the wavelength to measure the distribution of the color of the surface under measurement 5.

As described above, the present embodiment provides the following advantageous effects.

(1) According to the present embodiment, the direction of the optical axis 8c of the collimator lens 8 coincides with the direction of the normal 5a to the surface under measurement 5. The distance between the collimator lens and the surface under measurement 5 is therefore substantially fixed. Further, the traveling direction changer 9 is disposed in a position between the collimator lens 8 and the surface under measurement 5. The traveling direction changer 9 is disposed in parallel to the surface under measurement 5. The arrangement allows the light rays that form the light 6 having passed through the collimator lens 8 to travel in parallel to each other, whereby the first optical path length 10 between the traveling direction changer 9 and the surface under measurement 5 is substantially fixed across the light flux. The parallelized light 6a having passed through the collimator lens 8 is not exactly parallelized but contains the divergent light 6. The degree of divergence of the light 6 is, however, also substantially fixed because the first optical path length 10 is substantially fixed. As a result, the light 6 with which the surface under measurement 5 is irradiated can be uniformly distributed.

(2) According to the present embodiment, the distance between the traveling direction changer 9 and the surface under measurement 5 is fixed within the area where the parallelized light 6a travels. When the traveling direction changer 9 has a substantially plate-like shape, the traveling direction changer 9, the surface under measurement 5, and the parallelized light 6a form a parallelogram. Therefore, the traveling direction changer 9 and the surface under measurement 5 are parallel to each other, and the direction of the optical axis 8c of the collimator lens 8 coincides with the thickness direction of the traveling direction changer 9. The first optical path length 10 from the traveling direction changer 9 to the surface under measurement 5 is therefore substantially fixed within the area where the light 6 travels, whereby the degree of divergence of the light 6 is substantially fixed. As a result, the light 6 with which the surface under measurement 5 is irradiated can be uniformly distributed.

(3) According to the present embodiment, the filter 11 is disposed in a position between the traveling direction changer 9 and the surface under measurement 5. The filter 11 removes the divergent light 6 contained in the parallelized light 6a. The filter 11 therefore substantially prevents the parallelized light 6a having passed through the filter 11 from diverging, whereby variation in the optical intensity distribution due to the divergent light 6 can be suppressed. As a result, the light 6 with which the surface under measurement 5 is irradiated can be more uniformly distributed.

(4) According to the present embodiment, the distance between the filter 11 and the surface under measurement 5 is fixed within the area where the parallelized light 6a travels. When the filter 11 has a substantially plate-like shape, the filter 11, the surface under measurement 5, and the parallelized light 6a form a parallelogram. Therefore, the filter 11 and the surface under measurement 5 are parallel to each other, and the direction of the optical axis 8c of the collimator lens 8 coincides with the thickness direction of the filter 11. The optical path length from the collimator lens 8 to the surface under measurement 5 is therefore substantially fixed by a greater degree, whereby the degree of divergence of the light 6 can be substantially fixed by a greater degree. As a result, the light 6 with which the surface under measurement 5 is irradiated can be more uniformly distributed.

(5) According to the present embodiment, the collimator lens 8 is a Fresnel lens. The collimator lens 8 is therefore a thin lens. As a result, the length of the colorimetry apparatus 1 in the axial direction of the collimator lens 8 can be shortened.

(6) According to the present embodiment, the traveling direction changer 9 is formed of a prism array. The traveling direction changer 9 is therefore a thin portion. As a result, the length of the colorimetry apparatus 1 in the thickness direction of the traveling direction changer 9 can be shortened.

(7) According to the present embodiment, the traveling direction changer 9 is formed of a plurality of prism arrays layered on each other. Therefore, even when the prism array at each stage deflects the parallelized light 6a by only a small angle, the traveling direction changer 9 can cause the parallelized light 6a to travel in a desired direction.

Second Embodiment

Figure 6A:
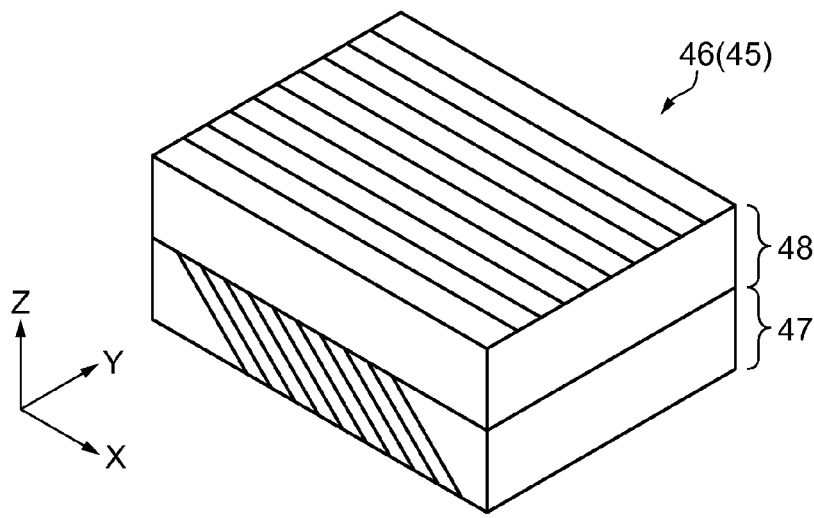
FIGS. 6A to 6C relates to a second embodiment.
Figure 6B:
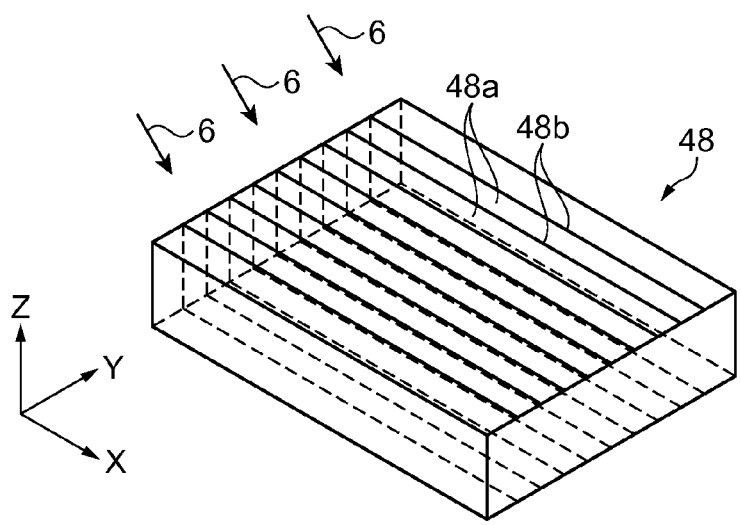
Figure 6C:
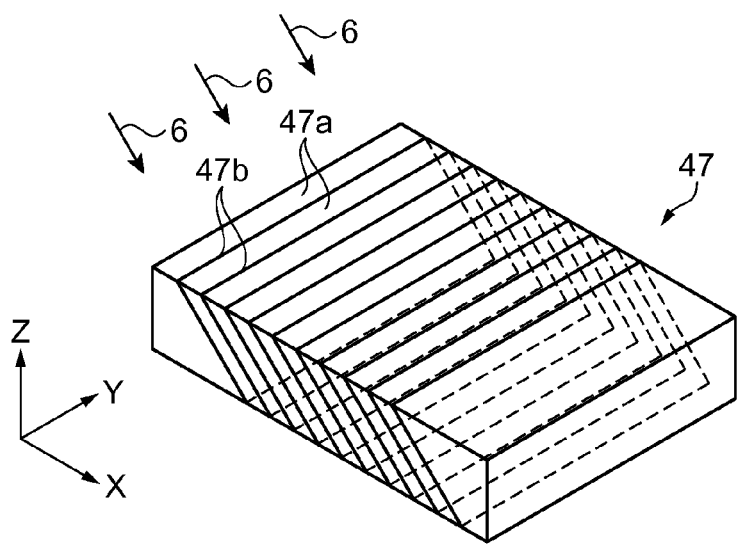

Another embodiment of the filter disposed in the colorimetry apparatus will next be described with reference to FIGS. 6A to 6C. FIG. 6A is a schematic perspective view showing the structure of the filter. FIG. 6B is a schematic perspective view showing the structure of an upper filter. FIG. 6C is a schematic perspective view showing the structure of a lower filter. The present embodiment differs from the first embodiment in terms of the structure of the filter 11. The same points as those in the first embodiment will not be described.

That is, in the present embodiment, a filter 46 is used in a colorimetry apparatus 45, as shown in FIGS. 6A to 6C. The filter 46 has the same function as that of the filter 11 in the first embodiment. The filter 46 is formed of a plate-shaped lower filter 47 and a plate-shaped upper filter 48 with the upper filter 48 layered on the lower filter 47. The upper filter 48 has a light transmitting portion 48a and a light absorbing portion 48b alternately layered on each other in the Y direction, as shown in FIG. 6B. Each of the light transmitting portions 48a is formed of a member having a rectangular columnar shape and transmitting light. Each of the light absorbing portions 48b is formed of a member having a film-like shape and absorbing light. The plurality of light absorbing portions 48b are disposed in parallel to the XZ plane.

Light 6 that travels in the direction parallel to the XZ plane can pass through the light transmitting portions 48a and reach the lower filter 47 through the upper filter 48. On the other hand, light 6 that travels in a direction that intersects the XZ plane enters the light transmitting portions 48a and impinges on the light absorbing portions 48b. The light 6 is absorbed by the light absorbing portions 48b and hence cannot travel toward the lower filter 47. The filter 46 therefore allows only the light 6 that travels in the direction parallel to the XZ plane to pass therethrough.

The lower filter 47 has a light transmitting portion 47a and a light absorbing portion 47b alternately layered on each other in a direction between the X direction and the Z direction, as shown in FIG. 6C. The plurality of light transmitting portions 47a and light absorbing portions 47b extend in a direction between the X direction and the −Z direction and in parallel to each other. Each of the light transmitting portions 47a is formed of a member having a rectangular columnar shape and transmitting light. Each of the light absorbing portions 47b is formed of a member having a film-like shape and absorbing light.

Light 6 that travels in the direction parallel to the direction in which the light absorbing portions 47b extend can pass through the light transmitting portions 47a and then travel toward the surface under measurement 5. On the other hand, light 6 that travels in the Z direction and light 6 that travels in the X direction enter the light transmitting portions 47a and impinge on the light absorbing portions 47b. The light 6 is absorbed by the light absorbing portions 47b and hence cannot travel toward the surface under measurement 5. The lower filter 47 therefore transmits only the light 6 that travels in the direction parallel to the light absorbing portions 47b.

The filter 46 transmits the light 6 that travels not only in the direction in which the light absorbing portions 48b extend but also in the direction in which the light absorbing portions 47b extend. The filter 46 therefore has the same optical characteristics as those of the filter 11 in the first embodiment.

Third Embodiment

Figure 7A:
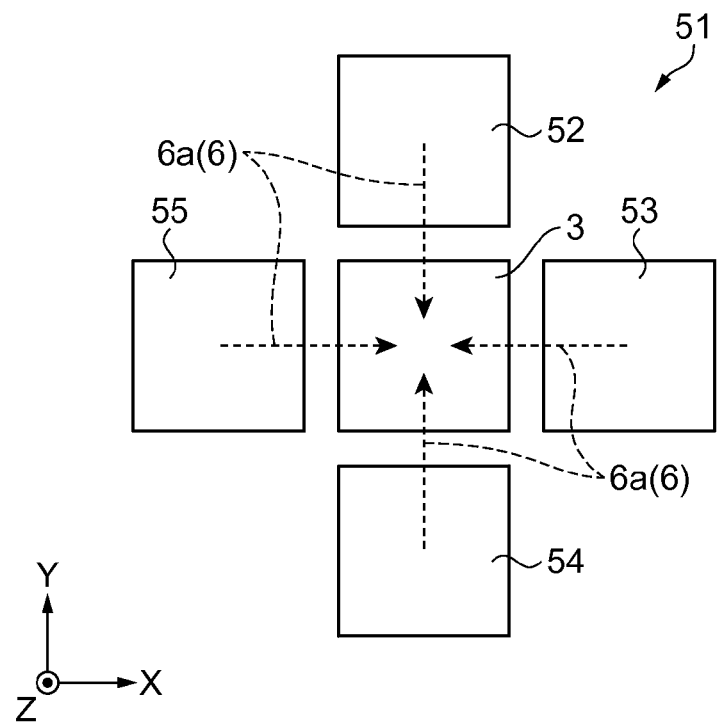
FIGS. 7A and 7B relates to a third embodiment.
Figure 7B:
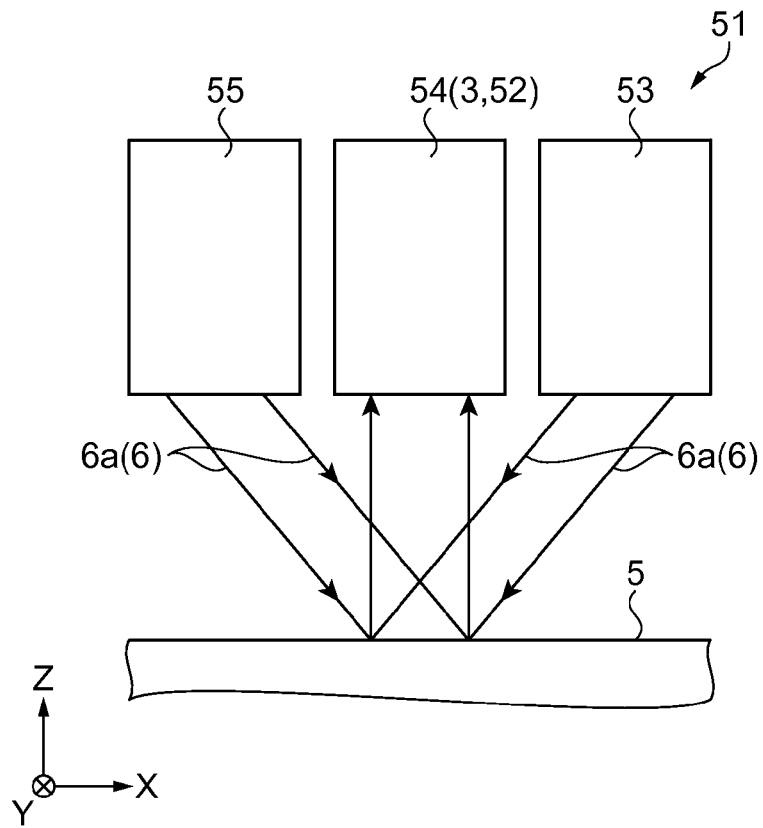

Another embodiment of the colorimetry apparatus will next be described with reference to FIGS. 7A and 7B. FIG. 7A is a diagrammatic plan view showing the structure of the colorimetry apparatus, and FIG. 7B is a diagrammatic side view showing the structure of the colorimetry apparatus. The same points as those in the first embodiment will not be described.

That is, in the present embodiment, a colorimetry apparatus 51 includes a first light projection unit 52, a second light projection unit 53, a third light projection unit 54, and a fourth light projection unit 55 disposed around the imaging unit 3, as shown in FIGS. 7A and 7B. Each of the first light projection unit 52 to the fourth light projection unit 55 has the same function as that of the light projection unit 2 in the first embodiment. The first light projection unit 52 is located on the Y-direction side of the imaging unit 3 and irradiates a portion of the surface under measurement 5, specifically, the portion facing the imaging unit 3 with the parallelized light 6a. The second light projection unit 53 is located on the X-direction side of the imaging unit 3 and irradiates the portion of the surface under measurement 5, specifically, the portion facing the imaging unit 3 with the parallelized light 6a. The third light projection unit 54 is located on the −Y-direction side of the imaging unit 3 and irradiates the portion of the surface under measurement 5, specifically, the portion facing the imaging unit 3 with the parallelized light 6a. The fourth light projection unit 55 is located on the −X-direction side of the imaging unit 3 and irradiates the portion of the surface under measurement 5, specifically, the portion facing the imaging unit 3 with the parallelized light 6a.

As a result, the portion of the surface under measurement 5, specifically, the portion where the imaging unit 3 captures an image thereof can be irradiated with light having intensity greater than the intensity of light with which the surface under measurement 5 is irradiated by the first light projection unit 52. The illuminance at the surface under measurement 5 where the imaging unit 3 captures an image thereof can therefore be increased. Since each of the first light projection unit 52 to the fourth light projection unit 55 has the same function as that of the light projection unit 2 in the first embodiment, the optical intensity distribution over the surface under measurement 5 is uniform. The colorimetry apparatus 51 can therefore measure the distribution of the color of the surface under measurement 5.

Each of the first light projection unit 52 to the fourth light projection unit 55 may radiate light 6 having a wavelength different from the others. For example, the first light projection unit 52 and the second light projection unit 53 radiate green light 6. The third light projection unit 54 radiates blue light 6. The fourth light projection unit 55 radiates red light 6. The light 6 radiated from the first light projection unit 52 to the fourth light projection unit 55 may be so adjusted that a flat illuminance distribution is achieved on a wavelength basis over the portion of the surface under measurement 5 where the imaging unit 3 captures images thereof. The configuration of each of the light projection units may be changed in accordance with a readily available light source 7.

The invention is not limited to the embodiments described above, and a variety of changes and improvement can be made thereto by those skilled in the art to the extent that the changes and improvements fall within the technical spirit of the invention. Variations follow.

Variation 1

In the first embodiment described above, a Fabry-Perot etalon is used as the wavelength tunable interference filter 17, but a filter having any other structure may be used. For example, an LCTF (liquid crystal tunable filter) may be used as the wavelength tunable interference filter 17. An LCTF has a structure in which a plurality of sets of a linear polarizer, a birefringence filter, and a liquid crystal cell layered in this order are stacked on each other. Adjusting a voltage applied to the liquid crystal cell allows the wavelength of the light 6 that passes through the LCTF to be selectively limited to a specific wavelength.

In addition to the above, for example, an AOTF (acousto-optic tunable filter) may be used as the wavelength tunable interference filter 17. An AOTF is formed of a tellurium dioxide crystal to which an acoustic wave is applied. When the crystal is irradiated with the light 6, the light 6 is diffracted and light 6 of a specific wavelength is separated. In this case as well, adjusting the frequency of the acoustic wave allows the wavelength of the light 6 that passes through the AOTF to be selectively limited to a specific wavelength. A filter that is readily manufactured and capable of precisely separating a desired wavelength may be selected as the wavelength tunable interference filter 17 from the filters that operate based on the methods described above. The color of the surface under measurement 5 can then be measured by capturing an image of the light of a specific wavelength.

Variation 2

In the first embodiment described above, an LED that emits white light is used as the light source 7. The light source 7 may be any other light emitter, or a plurality of LEDs that each emit light of a wavelength different from the others may be combined with each other. Instead, a fluorescent lamp, an incandescent lamp, a halogen lamp, a sodium lamp, a high-frequency fluorescent lamp, an EL (electro luminescence) device, a cold cathode tube, and other types of light emitter can be used. The light source 7 may be selected in accordance with the wavelength under measurement.

Variation 3

In the third embodiment described above, the first light projection unit 52 to the fourth light projection unit 55 are disposed around the imaging unit 3, specifically, on the four sides thereof. The light projection units may instead be disposed annularly around the imaging unit 3. In this case, the surface under measurement 5 can be irradiated with light having greater optical intensity.

The entire disclosure of Japanese Patent Application No. 2013-163040 filed on Aug. 6, 2013 is expressly incorporated by reference herein.

What is claimed is:

1. A colorimetry apparatus comprising:
    a light projection unit that irradiates a surface under measurement with light; and
    an imaging unit that captures an image of the surface under measurement,
    wherein the light projection unit includes:
    a light source,
    a collimator lens that converts light emitted from the light source into parallelized light, and
    a traveling direction changer that changes the traveling direction of the parallelized light, and
    a light exiting surface of the traveling direction changer through which the parallelized light exits is disposed approximately parallel to the surface under measurement, and an optical axis of the collimator lens is approximately parallel to a normal to the surface under measurement.

2. The colorimetry apparatus according to claim 1,
    wherein an optical path length of the parallelized light from the traveling direction changer to the surface under measurement is fixed within an area where the parallelized light travels.

3. The colorimetry apparatus according to claim 1,
    further comprising a filter provided in a position between the traveling direction changer and the surface under measurement, the filter preventing light other than the parallelized light from passing therethrough.

4. The colorimetry apparatus according to claim 3, wherein an optical path length of the parallelized light from the filter to the surface under measurement is fixed within an area where the parallelized light travels.

5. The colorimetry apparatus according to claim 1, wherein the collimator lens is a Fresnel lens.

6. The colorimetry apparatus according to claim 1, wherein the traveling direction changer is a prism array having rod-shaped prisms arranged therein.

7. The colorimetry apparatus according to claim 1, wherein the traveling direction changer is formed of a plurality of prism arrays layered over one another.

8. The colorimetry apparatus according to claim 1, wherein a plurality of the light projection units are provided in a plurality of positions, and the plurality of light projection units irradiate the surface under measurement.

* * * * *